United States Patent Office 2,969,285
Patented Jan. 24, 1961

2,969,285
CHOCOLATE CHIP TYPE FLAVORING FOR ICE CREAM AND METHOD OF PREPARING THE SAME

L. Russell Cook, Milwaukee, Wis., assignor to Ambrosia Chocolate Company, Milwaukee, Wis., a corporation of Wisconsin No Drawing. Filed Mar. 30, 1959, Ser. No. 802,639

7 Claims. (Cl. 99—23)

This invention relates to a chocolate flavoring product having particular utility in the manufacture of chocolate chip ice cream, and to a method of preparing the same.

That variety of frozen food product known as chocolate chip ice cream has attained a very important and voluminous acceptance with the consuming public. Conventionally, this product has been made in several different ways. One method, widely used, involves heating a chocolate material to melting temperature and while this material is in molten form, introducing the same into a stream of ice cream as the latter leaves the freezer. The sudden chilling of the melted chocolate thus introduced results in a distribution of chocolate throughout the ice cream in the form of small hardened bits or specks. In practice this method has not proved to be wholly satisfactory inasmuch as considerable labor is involved and certain working difficulties are encountered which many ice cream manufacturers find objectionable. Further, the flavor of the ice cream so produced has been weak and has been described by many persons as nearly tasteless.

Another method hitherto favored involves the step of first preparing the chocolate flavoring material by reducing it to small bits of suitable size to be in this form introduced, usually through a device known as a fruit feeder, into the stream of frozen ice cream as the latter emerges from the freezer. Alternatively, a batch process has been carried out whereby the prepared finely divided chips are poured into the freezer charged with ice cream just prior to the time the latter is "finished" in the freezer. This method has an advantage over the aforesaid process in that the product is available to the ice cream manufacturer in ready prepared form. However, the ready formed chips have presented a disadvantage in that they must be preserved in an air conditioned atmosphere to prevent them from lumping together, and further, the ice cream therefrom produced is unsatisfactory in that the chocolate chips are so hard as to resist mastication and even create a hazard to the consumer's dental equipment. Moreover, these chocolate chips are likewise characterized by an insipid or tasteless flavor.

A third method heretofore used for manufacturing so-called chocolate chip ice cream involves the preparation of a hard candy material coated with a thin layer of chocolate, which material on being comminuted into small pieces, is introduced into the ice cream in conventional manner. Whereas the ice cream so produced may loosely be entitled, chocolate chip ice cream, its chocolate content is far too small for good chocolate flavor.

It is an object of the present invention to produce a chocolate chip product, characterized by a higher or more intense flavor per unit of chocolate flavoring than has hitherto been available.

Another object of the present invention is to provide a chocolate chip product, in a form facilitating utilization by ice cream manufacturers.

It is a further object of the present invention to make possible the manufacture of chocolate chip ice cream having an improved chocolate flavor which is pleasing not only to persons who presently consume chocolate chip ice cream, bct also to others who hitherto have not found this type of ice cream to their liking.

It is a further object of this invention to provide a method of preparing a chocolate chip product for incorporation into ice cream which will impart an enhanced chocolate flavor thereto while at the same time avoiding the necessity for undesirably increasing the proportion of chocolate in the ice cream.

A further object of the invention involves the production of chocolate chips suitable for the manufacture of chocolate chip ice cream which chip product is amenable to storage under ordinary conditions, without occurrence of undesirable clumping and loss of shape.

Another object of the invention is to provide a chocolate chip product which when incorporated into ice cream will assume a soft consistency, the degree whereof can be controlled, the consistency achieved being more agreeable to the consumer than the chocolate chip material presently found in available forms of chocolate chip ice cream.

A still further object of the invention is to provide a chocolate chip product having a softer and more agreeable consistency than that of the chocolate chip material found in current forms of chocolate chip ice cream, and further having a readily controllable degree of softness adaptable to various preferences.

With the above and other objects in view which will appear as the description proceeds, this invention resides in the novel product and method by which it is made, substantially as hereinafter described and more particularly defined by the appended claims, it being understood that such changes in the precise embodiments of the hereindisclosed invention may be made as come within the scope of the claims.

The comparative tastelessness of present forms of chocolate chip ice cream is due to the inherent nature of the phase distribution of the chocolate components. Normally, chocolate comprises a suspension of solids in a continuous phase of cocoa butter. The cocoa butter per se is characterized by substantial lack of that flavor that most persons identify with chocolate. The flavor of the chocolate is actually locked in by the surrounding continuous phase of fatty matter. Accordingly, it is necessary that the cocoa butter melt in the mouth before the chocolate flavor can be tasted. When the fact is considered, that the melting point of cocoa butter is in the neighborhood of 88° F. to 90° F. and that the consumption temperature of ice cream normally is in the vicinity of 5° F. to 8° F., it becomes evident that the proportion of cocoa butter reduced to liquid state by body heat during the short period of retention of the ice cream in the mouth, is quite small. The net result is that the chips of chocolate are swallowed before any appreciable amount of the flavor of the chocolate is sensed.

In reviewing the possibility of releasing the "locked-in" chocolate flavor, it was conceived that this might be desirably achieved by reversing the phases whereby the cocoa butter would become the discontinuous phase.

Proceeding upon this premise, it is found that if appropriate quantities of a cocoa butter containing chocolate material, in such form, for example, as chocolate liquor, is admixed with appropriate quantities of sugar, and water, and heated and cooked at effective temperatures, with the treatment being continued to an extent sufficient to eliminate substantially all of the water, or at least to a point where the moisture content of the mass was reduced to about 6 percent by weight or less, that a product could be obtained wherein the said phases had been reversed, while at the same time preserving other qualities of the material desirable in an ice cream additive. In general, the process which has been determined to effectively achieve the aforesaid results may be described as a rather hard cook whereby the product hardens to an almost rock-like consistency when it is cooled. The foregoing procedure may then be followed by a crushing operation which reduces the material to particles or chips of suitable size.

It will be understood that by the term "chips" as used herein, reference is had to a particulated chocolate material in the size range ordinarily comprehended in the art under this term.

The chocolate chip product prepared in accordance with the present invention while retaining a desirable amount of cocoa butter is characterized by the fact that the cocoa butter exists in the dispersed phase, to wit, in the form of minute particles or globules, whereas the chocolate flavoring and sugar components are in the continuous phase.

The chips prepared as aforesaid may be introduced into ice cream in any conventional manner known to those skilled in the art, and the ice cream thereafter, in the usual manner, placed in the hardening room for a day or more, and then removed to ordinary type of ice cream storage such as furnished in stores and homes.

Upon the introduction of the chocolate chips prepared according to the present invention into ice cream, the chips, which as above described, are in a substantially dehydrated conditon, begin to absorb moisture from the body of the ice cream, and as the moisture continues to be absorbed the chips soften. This is a gradual and progressive procedure, and the precise degree of softness attained depends upon various factors such as the amount of moisture originally present in the ice cream, the temperature at which the ice cream has been stored, and the length of the storage time. By the time that these factors have been allowed to play their part in the course of the normal commercial handling, the chips in the ice cream may have softened to a degree such that a few of the chips will still retain a perceptible, albeit somewhat delicate, brittleness which is not objectionable, a few of the chips will have assumed a soft chewy consistency, and the majority of the chips will have been softened to virtually the same consistency as the ice cream itself.

In contrast, therefore, to the weak flavor of chocolate chip ice cream heretofore available, ice cream containing the chips of the present invention will be found to possess all the sought after chocolate flavor immediately upon the ice cream being taken into the mouth. The chocolate chips of the present invention supply the characteristic chocolate flavor by virtue of the processes of aqueous solution and dispersion of the taste substances in the mouth in the manner necessary for tasting all foods. Further, as now will become clear, the character of the taste intensity is subject to controlled modification by the length of the aging process, to which the ice cream is subjected. This period, if short, will provide a moderately brittle chip consistency, and, if longer, will develop a softer texture, and if sufficient time is provided all of the chips will be converted into that condition wherein the full chocolate flavor is instantaneously tasted by the consumer as the ice cream is eaten.

In preparing chocolate chips according to the present invention, a mixture of chocolate, sugar and water is prepared. Suitable proportions of the aforesaid components meeting the requirement of the process would generally comprise a major proportion of sugar, a minor proportion of chocolate and sufficient water to bring the foregoing components to a syrupy consistency. Thus, from 15 to 20 parts by weight cholocate liquor may be admixed with 26 to 28 parts by weight of corn syrup, and 26 to 57 parts by weight of sugar, together with water sufficient to bring the proportion thereof in the total mixture to a content of approximately 20 to 25 percent. The mixed materials may now be raised to a high cooking temperature, 250° to 290° being found suitable. Cooking of the materials is continued during which operation water is progressively expelled. When the water content has been reduced to a point of near dehydration, the product is poured on a slab or in a mold and permitted to harden. Generally the cooking may be advantageously continued until the water content is reduced to not more than 6 percent. The solidified product is then brought to a desired state of subdivision in any suitable manner, as by crushing. The thus prepared material may be stored and held in readiness for incorporation into ice cream.

The following specific examples illustrate processes suitable in the practice of the invention:

Example 1

In a cooking vessel there is mixed together 20 pounds of chocolate liquor, 54 pounds of sugar and 26 pounds of corn syrup. To this mass enough water is added to facilitate handling, about 20 to 25 percent water in the total mixture usually being sufficient. The mass now is cooked to a temperature of 260° F. until the water content is reduced to a very low value, which in any event should not substantially exceed about 6 percent, then poured into molds or on a slab, allowed to harden, and crushed to the proper particle size.

Example 2

Place in a cooking kettle 15 pounds of chocolate liquor, 57 pounds of sugar and 28 pounds of corn syrup. Add sufficient water to convert the materials into a readily handled syrup as above described, and cook the mass to a temperature of 265° F. the water content thereby being reduced as described in Example 1. The cooked mass now may be poured into molds or on a slab, allowed to harden, and crushed into the desired particle size for chocolate chip ice cream.

Other formulas similar to the above may be used and further modifications can be introduced. There may be included in the formula any one of the many available forms of milk, either whole or skim, and either fresh, condensed, evaporated or powdered, and various flavoring materials may be added, such as vanilla, vanillin, or citrus oils.

What is claimed as my invention is:

1. A method of preparing a chocolate chip product having the fat thereof in the dispersed phase in a form suitable for incorporation into ice cream comprising: admixing a minor proportion of chocolate liquor, and a major proportion of sugar; adding water sufficient to bring the mixture to a syrupy consistency; heating the mixture to a temperature within the range of approximately 250° F. to 290° F. and cooking said mixture for a period of time sufficient to reduce the water content thereof and bring said mixture to a nearly dehydrated condition; discontinuing the heat; cooling and solidifying the product with the fat thereof in the dispersed phase; and thereafter crushing and comminuting said solidified product into a state of subdivision suitable for incorporation into ice cream.

2. A method of preparing a chocolate chip product having the fat thereof in the dispersed phase in a form suitable for incorporation into ice cream comprising: admixing substantially equal parts of chocolate liquor, corn syrup and sugar; adding water sufficient to bring the material to a syrupy consistency; heating the mixture to a temperature within the range of approximately 250° F. to 290° F. and cooking said mixture for a period of time sufficient to reduce the water content thereof and bring said mixture to nearly dehydrated condition; discontinuing the heat; cooling and solidifying the product with the fat thereof in the dispersed phase; and thereafter crushing and comminuting said solidified product into a state of subdivision suitable for incorporation into ice cream.

3. A method of preparing a chocolate chip product having the fat thereof in the dispersed phase in a form adapted for incorporation into ice cream comprising: admixing 15 to 20 parts by weight of chocolate liquor, 26 to 28 parts by weight of corn syrup, and 26 to 57 parts by weight of sugar; adding water to the mixture sufficient to bring the proportion of water in the total mixture to a content of approximately 20 to 25 percent; heating the mixture to a temperature within the range of approximately 250° F. to 290° F. and cooking said mixture for a period of time sufficient to reduce the water content to a proportion up to but not substantially exceeding 6 percent; pouring the product into a mold or onto a slab; cooling and solidifying the product with the fat thereof in the dispersed phase; and thereafter crushing and comminuting said solidified product into a state of subdivision suitable for incorporation into ice cream.

4. A method of preparing a chocolate chip product having the fat thereof in the dispersed phase in a form adapted for incorporation into ice cream comprising: admixing 20 parts by weight of chocolate liquor, 26 parts by weight of corn syrup, 54 parts by weight of sugar, and water sufficient to bring the proportion of water in the total mixture to a content of approximately 20 to 25 percent; heating the mixture to a temperature of approximately 260° F. and cooking said mixture for a period of time sufficient to reduce the water content to a proportion up to but not substantially exceeding 6 percent; pouring the product into a mold or onto a slab; cooling and solidifying said product with the fat thereof in the dispersed phase; and thereafter crushing and comminuting said solidified product into a state of subdivision suitable for incorporation into ice cream.

5. A method of preparing a chocolate chip product having the fat thereof in the dispersed phase in a form suitable for incorporation into ice cream comprising: admixing 15 parts by weight of chocolate liquor, 28 parts by weight of corn syrup, 57 parts by weight of sugar, and water sufficient to bring the mixture to a syrupy consistency; heating the mixture to a temperature of approximately 265° F. and cooking said mixture for a period of time sufficient to reduce the water content to a proportion up to but not exceeding 6 percent; pouring the product into a mold or onto a slab; cooling and solidifying the product with the fat thereof in the dispersed phase; and thereafter crushing and comminuting said solidified product into a state of subdivision suitable for incorporation into ice cream.

6. A product produced by the process of claim 1.

7. A method of preparing a chocolate chip product having the fat thereof in the dispersed phase in a form suitable for incorporation into ice cream comprising: admixing chocolate liquor and sugar in proportions determined by the sweetness desired for the product, said mixture being a suspension of solids in fat in the continuous phase; adding water sufficient to bring the admixture to a syrupy consistency; heating the mixture to a temperature within the range of approximately 250° F. to 290° F. and cooking said mixture for a period of time sufficient to reduce the water content thereof and bring said mixture to a nearly dehydrated condition; discontinuing the heat; cooling and solidifying the product with the fat thereof in the dispersed phase; and thereafter crushing and comminuting said solidified product into a state of subdivision suitable for incorporation into ice cream.

References Cited in the file of this patent

UNITED STATES PATENTS

| Number | Name | Date |
|---|---|---|
| 215,341 | Finke | May 13, 1879 |
| 1,044,758 | Dierbach | Nov. 19, 1912 |
| 1,364,192 | Friedman | Jan. 4, 1921 |
| 2,332,513 | Heyman | Oct. 26, 1943 |